(12) United States Patent
Bhandari et al.

(10) Patent No.: US 8,219,440 B2
(45) Date of Patent: Jul. 10, 2012

(54) SYSTEM FOR ENHANCING BUSINESS PERFORMANCE

(75) Inventors: Muthulakshmi Bhandari, Bangalore (IN); Allison Baines Botros, Independence, OH (US); Edward H B Giesen, Bilthoven (NL); Raman Harishankar, Blacklick, OH (US); Jayashree Jaishankar, Bangalore (IN); Ahamed Jalaldeen, Bangalore (IN); Ying Tat Leung, Saratoga, CA (US); Ashish Mungi, Bangalore (IN); Siddharth N. Purohit, Allen, TX (US); Philip G. Rains, Naperville, IL (US); Jorge L. C. Sanz, Carmel, CA (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 12/701,245

(22) Filed: Feb. 5, 2010

(65) Prior Publication Data

US 2011/0196719 A1    Aug. 11, 2011

(51) Int. Cl.
*G06F 9/40* (2006.01)
(52) U.S. Cl. .................................. 705/7.39
(58) Field of Classification Search ............ 705/7.39
See application file for complete search history.

(56) References Cited

U.S. PATENT DOCUMENTS

| | | | |
|---|---|---|---|
| 5,745,878 A | 4/1998 | Hashimoto et al. | |
| 5,799,286 A | 8/1998 | Morgan et al. | |
| 6,363,393 B1 | 3/2002 | Ribitzky | |
| 6,442,557 B1 | 8/2002 | Buteau et al. | |
| 6,601,233 B1 | 7/2003 | Underwood | |
| 7,120,643 B2 | 10/2006 | Dill | |
| 7,239,985 B1 | 7/2007 | Hysom et al. | |
| 7,349,877 B2 | 3/2008 | Ballow et al. | |
| 7,398,240 B2 | 7/2008 | Ballow et al. | |
| 2001/0049615 A1 | 12/2001 | Wong et al. | |
| 2002/0128895 A1 | 9/2002 | Broderick et al. | |
| 2002/0169658 A1 | 11/2002 | Adler | |
| 2002/0194053 A1 | 12/2002 | Barrett et al. | |
| 2003/0074240 A1 | 4/2003 | Kaiser et al. | |
| 2003/0105655 A1 | 6/2003 | Kimbrel et al. | |
| 2003/0135399 A1 | 7/2003 | Ahamparam et al. | |
| 2003/0167198 A1 | 9/2003 | Northcott et al. | |
| 2004/0098392 A1 | 5/2004 | Dill | |
| 2004/0117234 A1 | 6/2004 | Lindsay-Scott et al. | |

(Continued)

FOREIGN PATENT DOCUMENTS

WO    2004040409 A2    5/2004

OTHER PUBLICATIONS

Corea et al.; "Challenges in business performance measurement: the case of a corporate IT function"; Proc. 5th Int. Conf. BPM 2007. vol. 4714, pp. 16-31, Spring-Verglag, Sep. 2007.

(Continued)

*Primary Examiner* — Romain Jeanty
(74) *Attorney, Agent, or Firm* — John R. Pivnichny

(57) ABSTRACT

A system gathers real-time data about an enterprise over a network. A user device displays a dashboard showing a component business model map, a heat map, key performance indicators for components, key performance indicators for the enterprise, and gradients. The business is enhanced by making investments and changes to those operations having large gradients.

6 Claims, 18 Drawing Sheets

U.S. PATENT DOCUMENTS

| | | |
|---|---|---|
| 2004/0162748 A1 | 8/2004 | Vogel et al. |
| 2004/0162749 A1 | 8/2004 | Vogel et al. |
| 2004/0162753 A1 | 8/2004 | Vogel et al. |
| 2005/0005261 A1* | 1/2005 | Severin .................. 717/108 |
| 2005/0091093 A1 | 4/2005 | Bhaskaran et al. |
| 2005/0203784 A1 | 9/2005 | Rackham |
| 2005/0246215 A1 | 11/2005 | Rackham |
| 2007/0022410 A1 | 1/2007 | Ban et al. |
| 2007/0156657 A1 | 7/2007 | Bredin et al. |
| 2007/0279416 A1 | 12/2007 | Cobb et al. |
| 2008/0027784 A1 | 1/2008 | Ang et al. |
| 2008/0126147 A1 | 5/2008 | Ang et al. |
| 2008/0215398 A1 | 9/2008 | Cohn et al. |
| 2008/0313110 A1 | 12/2008 | Kreamer et al. |
| 2009/0192867 A1 | 7/2009 | Farooq et al. |
| 2009/0198534 A1 | 8/2009 | Brown et al. |

OTHER PUBLICATIONS

"Integrated Method and System for Managing Software Components Development"; IP.com Journal. IPCOM/000021976D, Feb. 18, 2004.

Balthazard et al.; "Expertise, Extraversion and Group Interaction Styles as Performance Indicators in Virtual Teams"; the Database for Advances in Information Systems; vol. 35, No. 1, pp. 41-64; 2004.

Fraser et al.; "A Formal Specifications Maturity Model"; ACM Digital Library; pp. 95-105; vol. 40, No. 12, Dec. 1997.

List et al.; "Towards a Corporate Performance Measurement System"; ACM Digital Library; pp. 1344-1354; Sac'04, Mar. 2004.

Goldschmidt et al.; "A Case Study Evaluation of Maintainability and Performance of Persistency Techniques"; ACM; ICES'08, pp. 401-415, May 10-18, 2008.

Lee et al.; "Value-Centric, Model-Driven Business Transformation"; IEEE Computer Society, Proc. of the 8th IEEE Int. Conf. on E-Commerce Technology and the 3rd IEEE Int. Conf. on Enterprise Computing, E-Commerce, and E-Services, 2006.

"Platform-Independent MetaModel for Business Service Management," IP.com Journal, IPCOM 000184250D, Jun. 17, 2009.

"Enterprise Architecture Development and Usage Process," IP.com Journal, IPCOM 000145734D, Jan. 24, 2007.

Huner et al.; "Towards a Maturity Model for Corporate Data Quality Management," Proc. Sac'09, Mar. 8, 2009, Honolulu, Hawaii, pp. 231-238.

Renken, "Developing an IS/ICT Management Capability Maturity Framework," Proc. SAICSIT 2004, pp. 53-62.

Kangtae, Kim, "A Case Study on Architectural Maturity Evaluation: Experience in the Consumer Electronics Domain," AN-10337602, 2008.

Glissman and Sanz, "A Comparative Review of Business Architecture," IBM Research Report RJ 10451, Aug. 24, 2009.

Freeland, The Ultimate CRM Handbook, McGraw Hill, New York, 2003, Chapter 1, pp. 3-9.

Enterprise Agility, Inc. Business Maturity Models (BAMM). 2009. http://www.thebamm.org/wp/The_Business_Change_EcoSystem_and_Maturity_Models_-_Press_Release.pdf.

Kaliski, Burton S; Encyclopedia of Business and Finance; New York Macmillan Reference USA, Gale Group, 2001, pp. 38, 70 and 199.

"Let ACC Help you Thrive in a Perpetual Changing World Environment," American Cybernetic Corporation, 2001, http://web.archive.org/web/20011214072250/http://www.amcybernetic.com/orgdev_overview.html.

Nixon, "Evaluating Design Performance," Int. J. of Technology Management, vol. 17, No. 7-8, p. 814-829, 1999.

Veryard, Richard; "The Component Based Business: Plug and Play," Springer-Verlag, London, 2001.

* cited by examiner

| Sr. No. | Criteria / Review Item Description | Mandatory or Optional | Mapping to Maturity Level | Review Findings | |
|---|---|---|---|---|---|
| | | | | Criteria Satisfied? (Yes / No) | Remarks |
| 1 | Criteria 1 | Mandatory | 1 | Yes | |
| 2 | Criteria 2 | Mandatory | 1 | Yes | |
| 3 | Criteria 3 | Optional | 1 | Yes | |
| 4 | Criteria 4 | Mandatory | 2 | Yes | |
| 5 | Criteria 5 | Mandatory | 2 | No | |
| ... | ... | ... | ... | ... | ... |
| N | Criteria N | Mandatory | 3 | | |

FIG. 5

| AGGREGATE MATURITY LEVEL | MATURITY LEVEL | | | |
|---|---|---|---|---|
| | Component Business Model | Process Model | Service Model | Information Model |
| Level 1: Defined | Level 1: Defined | Level 1: Defined | Level 1: Defined | Level 1: Defined |
| Level 2: Enhanced | Level 2: Enhanced | Level 2: Enhanced | Level 2: Enhanced | Level 2: Enhanced |
| Level 3: Refined | Level 3: Refined | Level 3: Refined | Level 3: Refined | Level 3: Refined |

FIG. 6

| | Business Administration | Product Management | Acquisitions | Customer Portfolio Management | Customer Service and Sales | Product Operations | Customer Accounting | Financial Management |
|---|---|---|---|---|---|---|---|---|
| Planning & Analysis | Business Planning | Sector Marketing Plans | | Customer Portfolio And Analysis | | Product Operations Management | Customer Accounting Policies | Risk Management |
| | Business Architecture | Managing Products | Acquisition Planning and Oversight | Credit and Risk Management | | | | |
| Checks & Controls | Business Unit Administration | | | Application Processing | Customer Servicing and Sales Planning | Operations Administration | Reconciliations | Securitization |
| | Manage Alliance Relationships | Product Development And Deployment | | | Case Handling | | | Financial Control |
| | Policy & Procedure Manuals | | | Customer Behavior Decisioning | Service/Sales Administration | | Billing | Treasury |
| | HR Management | | Target Lists (Prospecting) | | Sales and Cross-Sell | Authorizations | Payments | Financial Consolidation |
| Execution | Administer Alliance SLAs | Marketing | | | Servicing (Dialogue Handler) | Financial Capture | Customer Account | Collections and Recovery |
| | Audit/QA/Legal | | Campaign Execution | Contact/Event History | | Product Processing | | |
| | Facilities | Market Research | | | | Rewards Management | Financial Capture | |
| | Develop and Operate Systems | Product Directory | | Correspondence | Smart Routing | Inventory Management | | |
| | Accounting and G/L | | | | | | | |

FIG. 9

SYSTEM FOR ENHANCING BUSINESS PERFORMANCE

CROSS REFERENCE TO RELATED APPLICATION

This application is related to U.S. application Ser. No. 12/632,256 filed Dec. 7, 2009 entitled ASSESSING THE MATURITY OF AN INDUSTRY ARCHITECTURE MODEL. This application is also related to U.S. application Ser. No. 12/630,063 filed Dec. 3, 2009 entitled SYSTEM FOR MANAGING BUSINESS PERFORMANCE USING INDUSTRY BUSINESS ARCHITECTURE MODELS. This application is also related to U.S. application Ser. No. 12/631,092 filed Dec. 4, 2009 entitled TOOL FOR CREATING AN INDUSTRY BUSINESS ARCHITECTURE MODEL. The above three related applications shall be incorporated herein by reference in their entireties.

BACKGROUND OF THE INVENTION

1. Field of the Invention

The invention relates generally to systems for business performance evaluation and improvement. In particular the invention relates to systems for constructing business models for business performance assessment and adjusting the models to enhance business performance. More particularly the business models are industry business architecture models (IBAM) including component business models (CBM).

2. Description of the Related Art

Rackham in U.S. application Ser. No. 10/796,367 describes the component modeling process and elements. In particular Rackham describes a component business modeling map and a process for filtering this map to form a heat map of components.

Bhaskaran in U.S. application Ser. No. 10/692,898 filed Oct. 24, 2003 discloses end-to-end business process solution creation with business measurements and initiatives according to defined business goals and objectives of an entity. Business operations of the entity are modeled in terms of business process elements including process tasks, artifact flows, artifact repositories and business commitment elements including key performance indicators. Bhaskaran's model and process elements may be continuously refined over a solution development lifecycle.

Ang in U.S. application Ser. No. 11/496,917 filed Jul. 31, 2006 describes a goal-service modeling approach using key performance indicators for measurement of attainment of goals. Rackham, Bhaskaran, and Ang shall be incorporated herein by reference in their entireties.

Bhandari in U.S. application Ser. No. 12/630,063 filed Dec. 3, 2009 and Ser. No. 12/631,092 filed Dec. 4, 2009 describes systems for creating industry business architecture models and for managing business performance using such models. Bhandari also describes in U.S. application Ser. No. 12/632,256 filed Dec. 7, 2009 a system for assessing the maturity of such industry business architecture models. The above three applications by Bhandari shall be incorporated herein by reference in their entireties.

BRIEF SUMMARY OF THE INVENTION

The system of the present invention is used to enhance the business performance of an enterprise. The enterprise is typically a large business with a complex structure such as a major corporation. This enterprise is analyzed and modeled using the systems described by Rackham, Bhaskaran, Ang, and Bhandari. Such analysis and modeling using these systems may be the subject of a large consulting contract with a business services providing company.

In addition to analysis and modeling, the enterprise wants to invest in systems to enhance its business performance. The present invention provides such a system using real-time data collection apparatus, real-time calculation of operational and enterprise key performance indicators, and calculation of gradients of the enterprise key performance indicators with respect to the operational key performance indicators. The consulting company may then use the gradients to determine where new investments by the enterprise will produce the best enhancements in the business performance of the enterprise.

BRIEF DESCRIPTION OF THE SEVERAL VIEWS OF THE DRAWINGS

FIG. 5 is a maturity assessment checklist;

FIG. 6 is a framework for a maturity model;

FIG. 9 shows a representative component business model map;

DETAILED DESCRIPTION OF THE INVENTION

Figure 1:
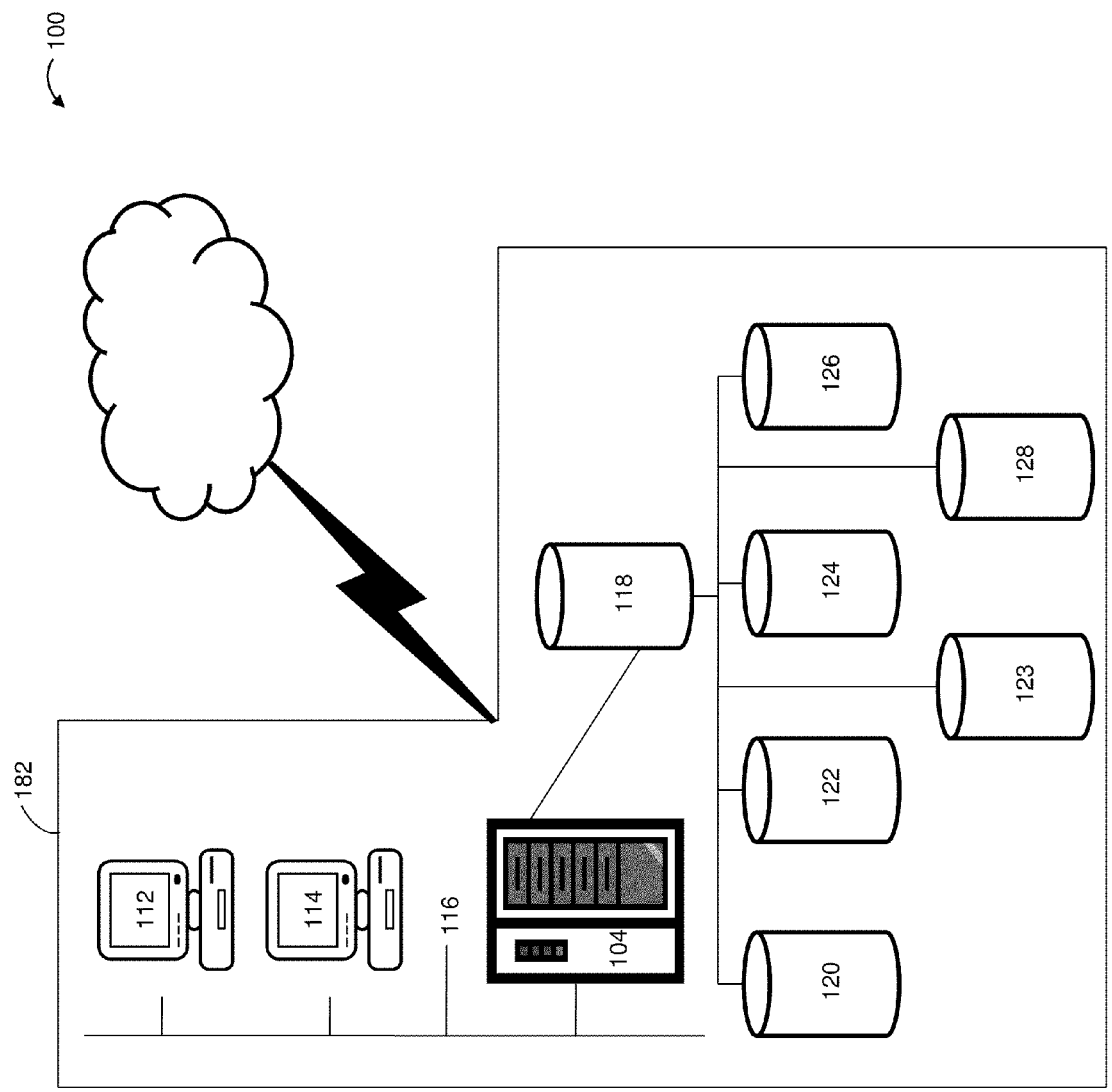
FIG. 1 is a network system for implementing an industry business architecture model and assessing its maturity.

In FIG. 1 there is shown a network system upon which the present invention is implemented. System 100 of FIG. 1 includes a business enterprise 182 having server 104 and data storage device 118 having databases 120-128. System 100 also has client systems 112 and 114 representing computer workstations, laptops, personal data assistants, cell phones, or any other client device known in the art. System 100 may also include a network connection to the Internet or any other network whether broadband or not, depicted by the cloud and lightning elements of FIG. 1.

Client systems 112, 114 may be operated by representatives of business enterprise 182 including information technology (IT) professionals, architecture specialists, business professionals, management, and system administrators. The term "business enterprise" shall be taken herein to refer to the organization implementing the IBAM of the present invention.

Network 116 connecting client systems 112, 114 to server 104 may comprise a LAN, WAN, wireless, infrared, radio, or any network configuration known in the art. Business enterprise 102 executes the IBAM via server 104, client systems 112, 114 or a combination of these.

Server 104 has data storage 118 attached either directly or via network 116. Data storage has a plurality of databases 120-128 included therein.

System 100 may also include wired or wireless connection to a wide area network including multiple geographical locations interconnected by high speed data lines or radio links as depicted by the lightning and cloud elements of FIG. 1.

In an exemplary embodiment, the industry architecture model may be executing on server 104, or clients 112, 114, or on a combination of the above.

Figure 2:
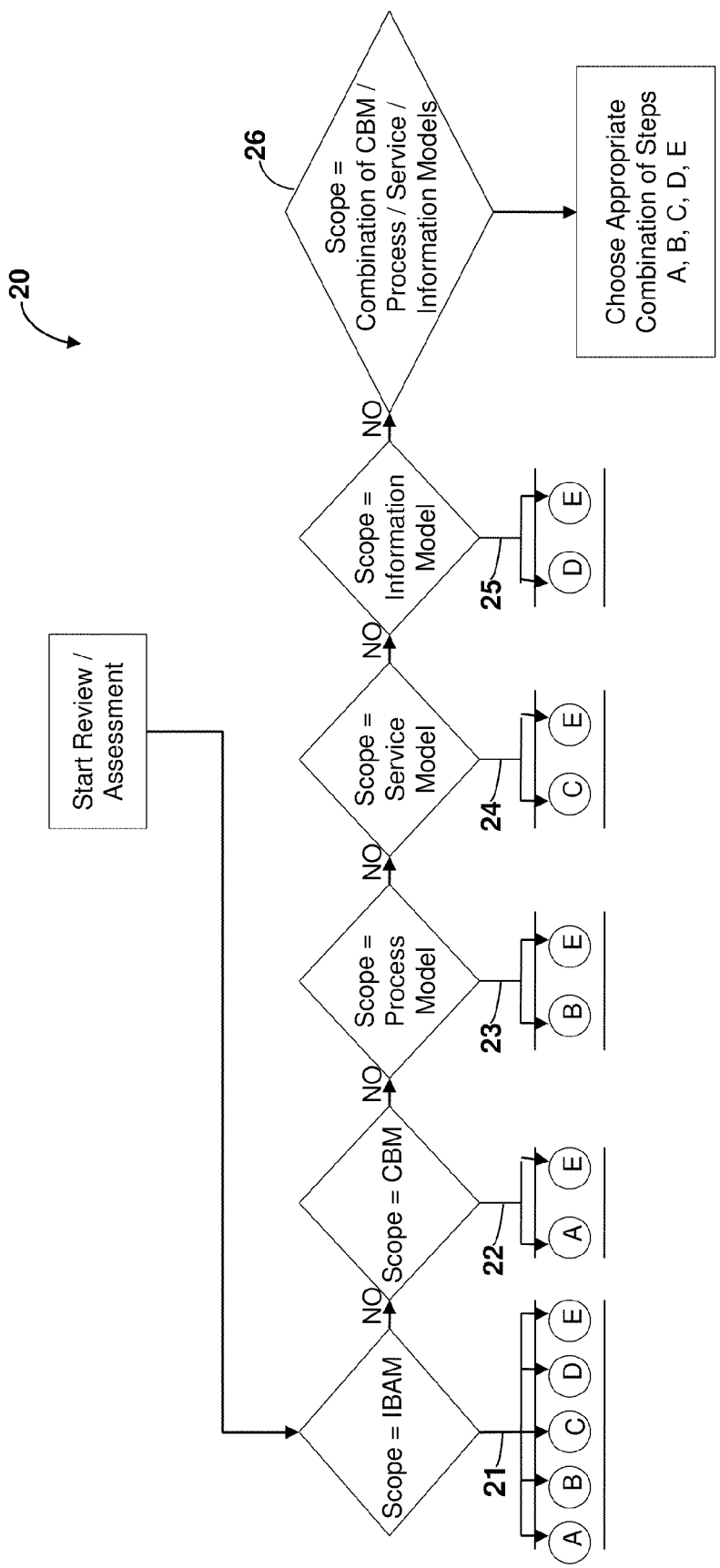
FIG. 2 is a flowchart for determining which models to assess maturity.

In FIG. 2 there is shown flowchart 20 for selecting the scope of a maturity assessment. The scope may be for an entire IBAM resulting in an aggregate maturity assessment by selecting path 21 to FIG. 3. The scope may be for the component business model, or the process model, or the service model, or the information model by selecting paths 22, 23, 24 or 25 respectively, leading to FIG. 3. The scope may also be any combination of models as indicated by decision block 26 in FIG. 2.

Figure 3:
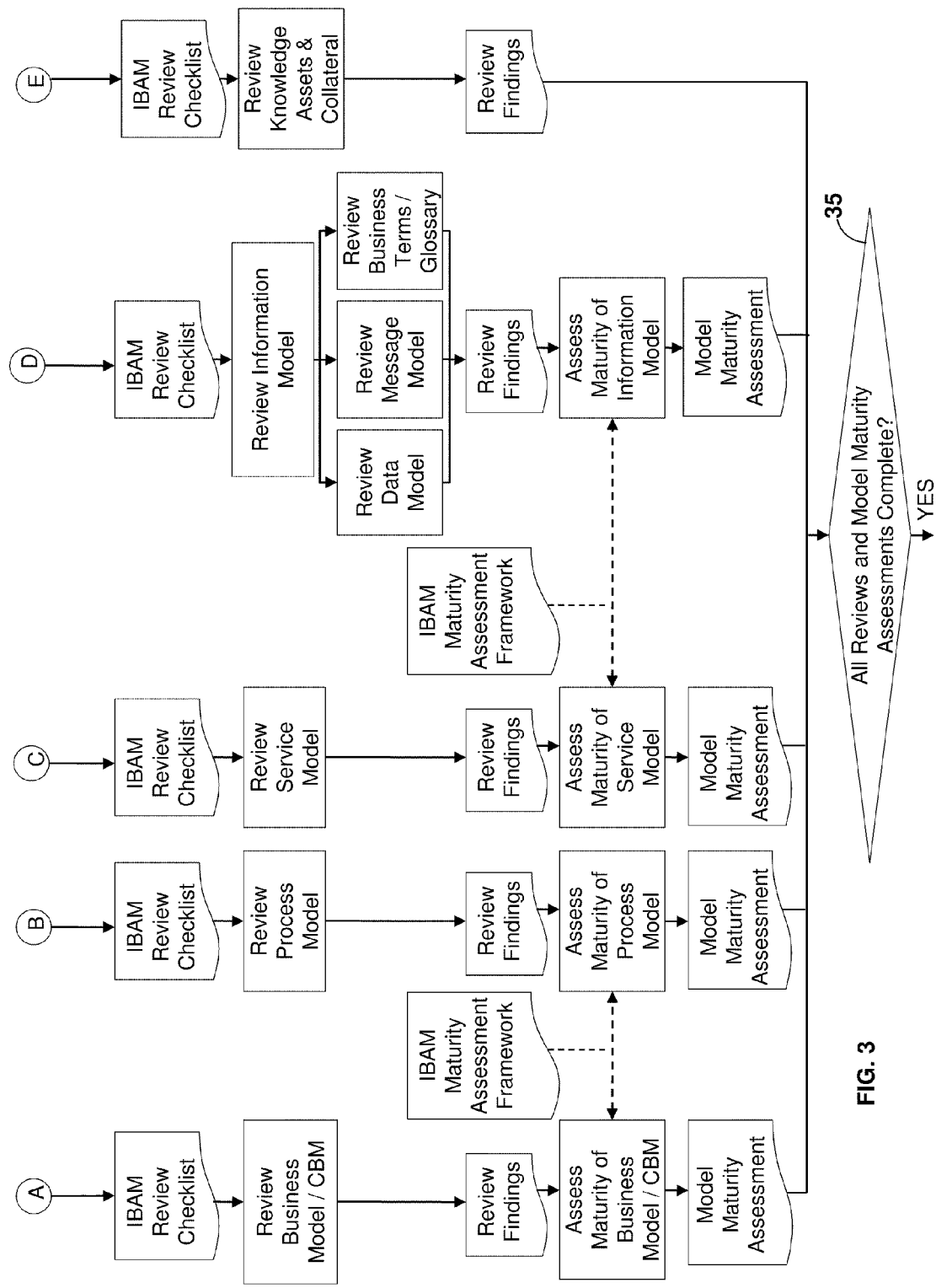
FIG. 3 is a flowchart for selecting the scope of a maturity assessment.

After selecting the scope as described above, the appropriate paths are taken in the flowchart of FIG. 3. For each path an extensive checklist such as the example shown in FIG. 5, which has been previously developed, is reviewed to insure completeness of the respective model. Each item in a checklist is mapped to one of the maturity levels of the maturity assessment framework of FIG. 6. For each of the models separately, the maturity level is assessed using a checklist and the framework of FIG. 6. For example, the levels may be designated as defined, enhanced, or refined with defined as the lowest and refined as highest as shown in FIG. 6. Other level scales may be used. Finally in decision block 35 it is determined whether all model assessments are complete according to the scope from FIG. 2 above. If not, then the remaining paths of FIG. 3 are followed as necessary. Note that all selections of scope from FIG. 2 require step Ⓔ to be performed for a review of knowledge assets and collateral.

Figure 4:
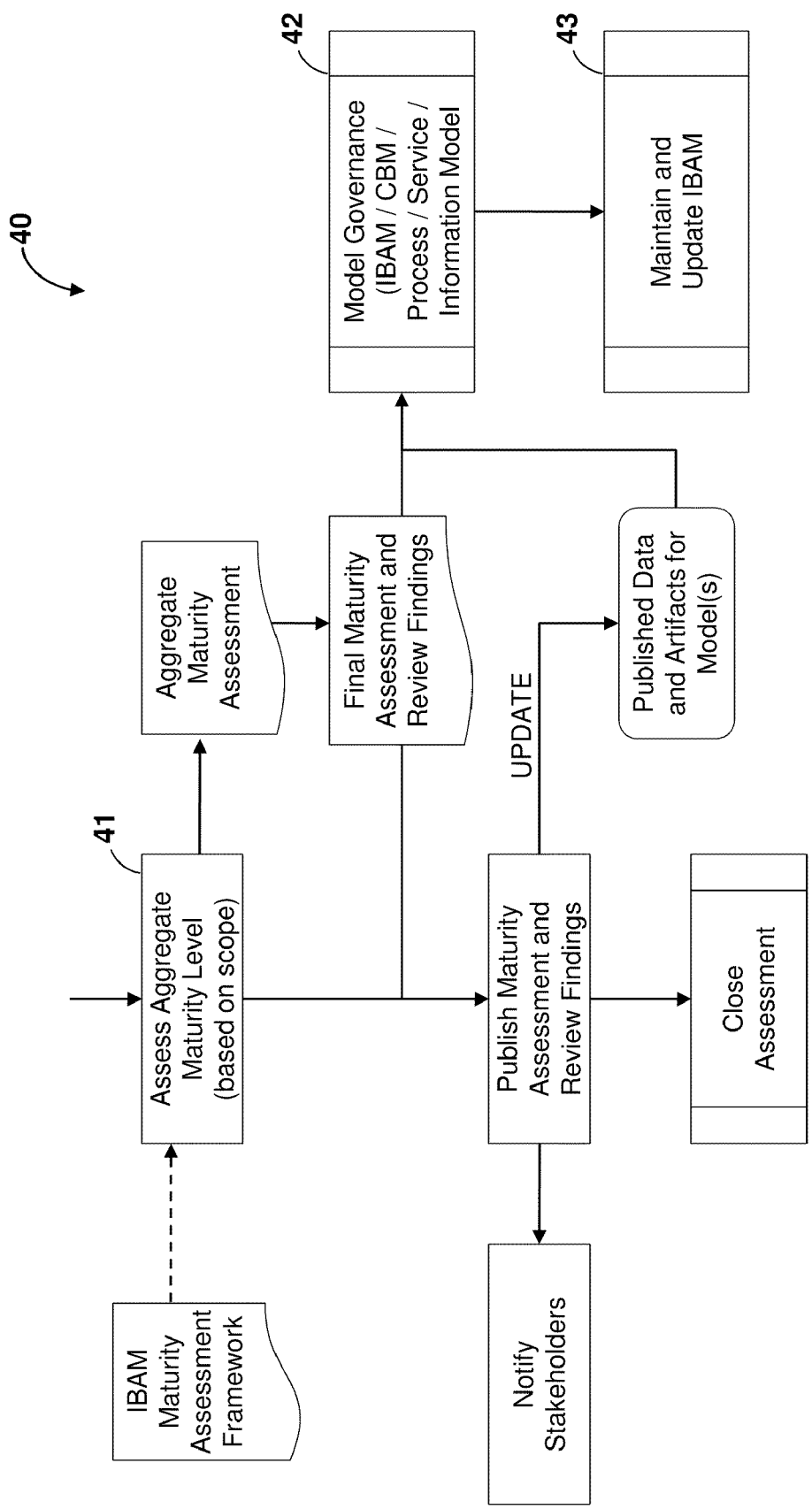
FIG. 4 is a flowchart for assessing maturity.

In FIG. 4 there is shown a flowchart 40 for assessing aggregate maturity level of an IBAM. Entering the flowchart at block 41, the aggregate maturity level of the IBAM is assessed according to an algorithm. One example of such an algorithm is a rule that the aggregate maturity level is no higher than the lowest individual maturity level of its constituent models. In FIG. 6, if the lowest level of CBM maturity, or process maturity, or service maturity, or information maturity is level 2, even though some may be level 3, then the aggregate maturity level is set to level 2. Other algorithms will be apparent to those skilled in the art of aggregate level setting, such as weighted average, maximum level, minimum level, and the like.

In FIG. 4 there is also shown step 42 for governance of the IBAM as well as the constituent CBM, process, service, and information model. Governance is described by Brown in U.S. application Ser. No. 12/024,746 filed Feb. 2, 2008 and published as U.S. 2009/0198534 on Aug. 6, 2009 which is incorporated herein by reference in its entirety.

Following step 42, the IBAM is updated in step 43 based on the aggregate maturity assessment of step 41, thereby completing a closed loop path back to the IBAM itself. The algorithm for assessing aggregate maturity level may also be adjusted in step 43.

Figure 7:
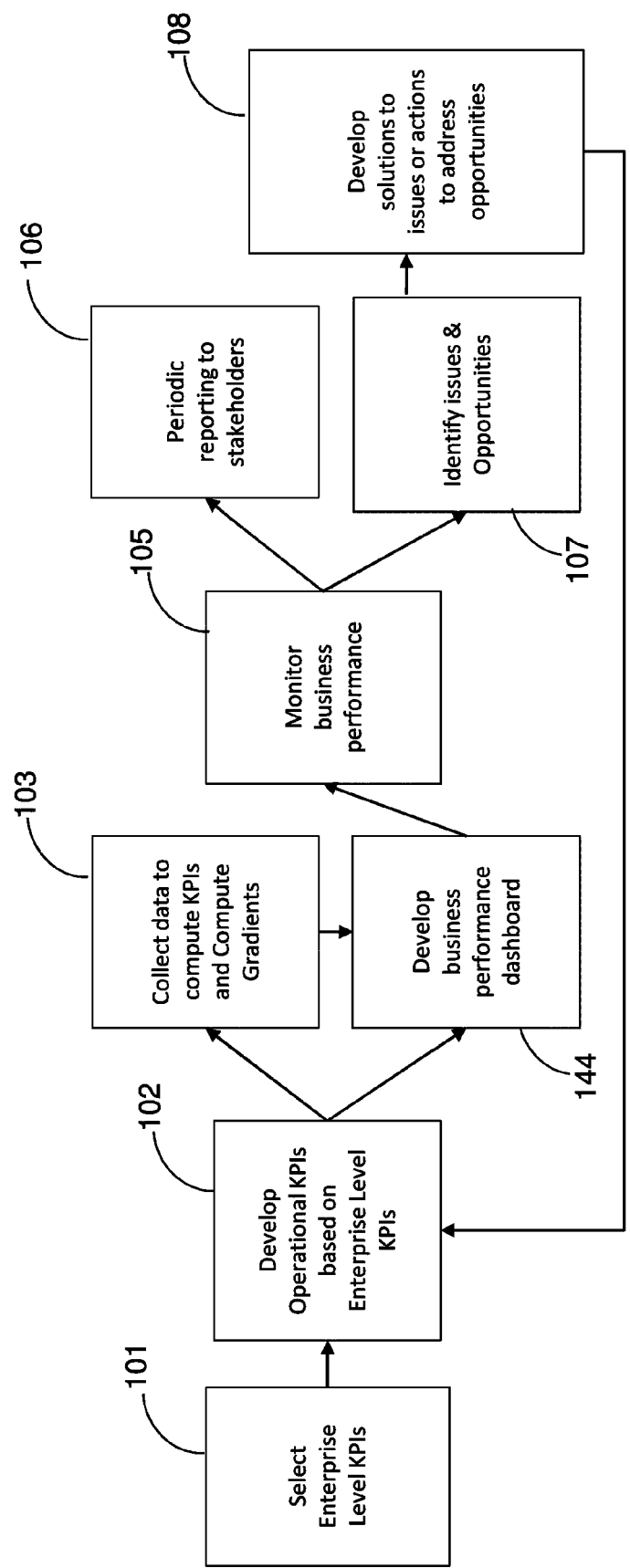
FIG. 7 shows the life cycle of managing business performance according to the present invention.

In FIG. 7 there is shown a lifecycle flowchart of business performance management in accordance with the present invention. A component business model map such as described below and shown in FIG. 9 has been previously generated. The techniques of generation are described in application Ser. No. 10/796,367. In step 101 of FIG. 7, enterprise level key performance indicators (KPIs) are selected.

Key performance indicators, also known as key success indicators or key business indicators are used by businesses to define and measure progress toward their goals. As used herein, KPIs represent quantifiable, measurable objectives, agreed to beforehand, that reflect the critical success factors of an organization. KPIs differ depending on an industry or organization. A sales organization may use the percentage of its sales that come from return customers. A customer service organization may measure the number of customer service calls answered in less than one minute. To determine if the objectives associated with a KPI are being met, the KPI may need to be broken down into one or more metrics, which are specific measurements to collect for analysis. According to the present invention the measurements are collected in real-time using data collective apparatus 114 connected to various systems, devices, and terminals located throughout the enterprise.

The KPIs in step 101 are enterprise level KPIs dealing with indicators of progress for the enterprise.

In step 102 of FIG. 7, operational KPIs at the business component level are developed for each component, based on the enterprise level KPIs.

The operational KPIs are selected from the KPIs provided by the Industry Business Architecture Models for the industry of the enterprise.

One or more models of the enterprise level KPIs as a function of some or all of the operational KPIs is developed as follows, taking advantage of the non-overlapping, activity oriented nature of a component business model.

If detailed data on the enterprise level KPIs or the operational KPIs are not available, such as when the performance management system shown in FIG. 7 is being built but not yet operational, a top-down approach is used. In this approach, the value of the enterprise level KPIs is modeled as a weighted combination of operational KPIs:

$$EP = \sum_{i=1}^{N} w_i OP_i$$

Where EP=enterprise level KPI, $OP_i$=the i-th operational KPI, $w_i$=weight for the i-th operational KPI, N=number of operational KPIs that affect the enterprise level KPI. For example, EP is a cost measure, such as the total cost to produce a product, and $OP_i$ is the cost to produce that product for relevant activities in business component i, $w_i$ is chosen to be 1, so that the total cost is the sum of the costs of the relevant activities in all the components. This approach is consistent with the principles of the known activity-based costing approach in cost accounting. Another example is that EP is the total revenue related to a product, $OP_i$ is the revenue from activities in business component i relevant to the product, $w_i$ is chosen to be 1, so that the total revenue is the sum of the revenue contribution of the relevant activities in all the components.

When EP is not a cost or revenue measure, the selection of $w_i$ in the above top-down approach is based on expert opinion. For example, $w_i$ can be chosen to be 1/N so that EP is an average of all the individual contribution of the operational KPIs of the components. In some cases, a poll is conducted among business executive and other subject matter experts and a weighted average of the poll results is used to determine $w_i$.

Figure 8:
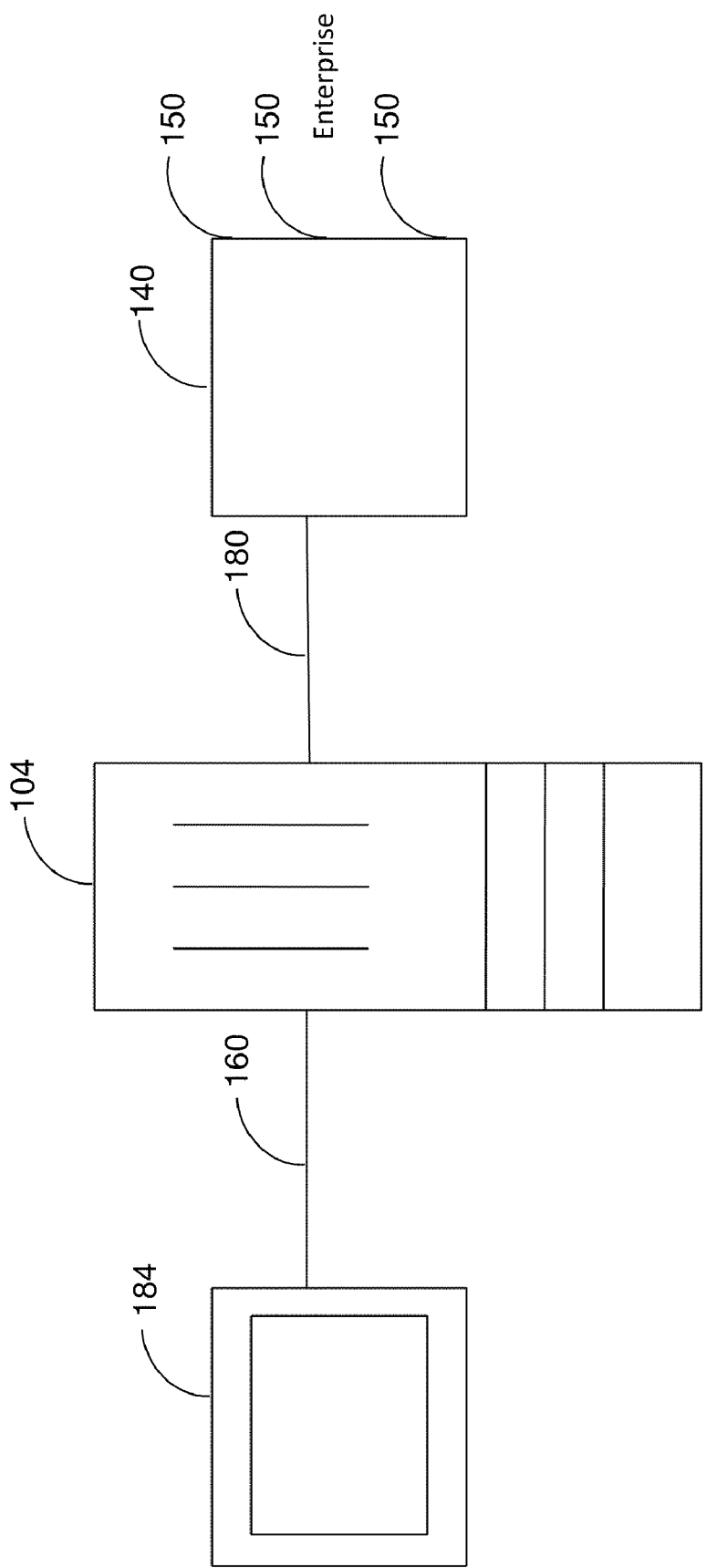
FIG. 8 is a block diagram depicting a system in accordance with the present invention.

When detailed data on EP and $OP_i$ are available, such as when the operation of the performance management system in FIG. 8 has been commenced for some time, an alternative approach to the above top-down approach is used. In this approach, a causal model of EP as a function of $OP_i$ (i=1, . . . , N) is developed using known techniques including linear and non-linear regression, or structural equation modeling techniques, or artificial intelligence techniques such a neural networks.

In step 103 of FIG. 7 data for computing values for the KPIs is collected in real-time using data collection apparatus 140 described above.

In step 144, a business performance dashboard is developed specific to the business being analyzed. The system of the present invention includes a dashboard developing capability wherein the dashboard displays a component business model map such as the example shown in FIG. 9. The map has been developed using an industry business architecture model. The map has business processes, the enterprise key performance indicators and attributes.

The map also has the operational key performance indicators described above and the computed real-time values thereof.

The system and dashboard of the present invention are constructed in such a manner that a user can select an enterprise key performance indicator whereupon the dashboard displays a heat map corresponding thereto.

The system and dashboard may also be used to display an enterprise key performance tree.

Each tree shows the structure of a model of an enterprise level KPI as a function of the operational KPIs determined in step 102. The real-time, computed values of the operational KPIs are shown on their respective business components. The real-time, computed values of the enterprise level KPI is also shown on an enterprise performance section of the screen. In some cases, the value of an enterprise level KPI may not be available in real-time. For example, revenue as an enterprise level KPI may not be computed in real-time but only periodically (such as monthly), or customer satisfaction as an enterprise level KPI is only available periodically after a customer survey is conducted. In these cases, the weighted combination above is used to compute the value of the enterprise level KPI which is then displayed on the screen.

The key performance tree may be displayed as a traditional tree structure with the enterprise level KPI as the root and operational KPIs as its children, and also as a heat map of the business components associated with the operational KPIs relevant to the enterprise level KPI.

In addition, corresponding to each operational KPI shown on a business component, the impact of the operational KPI on each relevant enterprise level KPI is shown through displaying the gradient of the enterprise level KPI with respect to that operational KPI. The gradient is computed from the model of the enterprise level KPI as a function of the operational KPIs using techniques of differentiation or finite difference.

In step 105, business performance is monitored in real-time using server 104, display 120, and data collection apparatus 140 of FIG. 8. Display 120 shows the dashboard as just described. By monitoring business performance in this manner using the system and dashboard of the present invention, reports can be periodically made to stakeholders in step 106. In addition, issues and opportunities can be identified 107 from the monitored performance of step 105.

Finally in step 108 of the lifecycle flow chart of FIG. 7, solutions are developed for the issues identified in step 107. Furthermore, actions are also taken to address the opportunities identified in step 107.

If the value of an enterprise level KPI is directly available, the system computes the enterprise level KPI using its corresponding operational KPI values collected, and compares this computed value to the value directly collected from data. When a significant gap exists between the computed and the observed values, the model of the enterprise level KPI is updated by repeating the steps 102 and 103.

When the value of one or more enterprise level KPI is deemed unsatisfactory, an issue and the corresponding opportunity for performance improvement exist. The key performance tree described above is examined. For each of the operational KPIs shown in the key performance tree, the value of the operational KPI, and the gradient of the enterprise level KPI with respect to that operational KPI are examined. An issue exists when the value of an operational KPI is deemed unsatisfactory and an improvement opportunity exists when an unsatisfactory operational KPI is associated with a significant positive gradient of the enterprise level KPI. Heat maps as described below can be used to aid identification of issues and opportunities.

To further investigate an opportunity, the user can enter a "what-if" value of the identified operational KPI into the key performance tree and the system will compute the corresponding value of the enterprise level KPI. A range of "what-if" values of the identified operational KPI can also be entered and the system will plot a graph of the enterprise level KPI values. Similarly, other operational KPIs in the key performance tree can be investigated.

As such solutions and actions are implemented, a natural feedback path is taken back to step 102 where new or updated operational KPIs based on the enterprise level KPIs may be developed.

FIG. 8 shows a system suitable for implementing an embodiment of the present invention. Server 104 is operably connected to display device 184 over connection 160. Server 104 is also operably connected to data collection apparatus 140 over connection 180. Server 104 which is also shown in FIG. 1 may be any type of computing system known in the art capable of executing instructions for implementing necessary steps of the embodiment. Typically server 104 may include a processing unit, I/O interface, network adaptor and memory.

Connections 160 and 180 may be any type of connection known in the art for transferring data such as a bus, network, wireless, infrared, or the like. Display device 184 includes a viewing screen but may also include processing hardware and software. Indeed, display device may comprise a workstation, laptop, personal digital assistant, cell phone, or any device having a display screen, including client systems 112 and 114 of FIG. 1.

Data collection apparatus 140 includes connections 150 to various systems, devices, and terminals (not shown) located within an enterprise for gathering data, including cost center data, necessary for calculating key performance indicator values in real-time.

In FIG. 9 there is shown an example of component business model map 125 in accordance with the present invention. The map is a matrix of activities having rows and columns. The rows of matrix 125 are grouped into three management levels of business activities, namely, planning and analysis, checks and controls, and execution. The rows of the matrix are standard for all industries, defining three levels of management control. For each grouping of activities in a column, a combination of these three levels is usually required to ensure the business operates effectively. The names of these levels may vary based on specific requirements. For example, the first level may be named "Direct" instead of "Planning and Analysis"; the second level may be named "Control" instead of "Checks and Controls".

The columns of matrix 125 are activity categories which are industry specific. However, once a good component map is built for any client, it may be used for any other client or competency in that specific industry. Business activities are determined in interviews supported by subject area specialists to identify both current and future capabilities. Activities may be specified in the general terms of: Functionality—the Subject; Users—Skill level, authority; Systems; Analytical; Operational, decisioning; Automated; Operational Characteristics; Business information usage; or any other general terms used in the industry.

Components within the activity categories should be able to be extracted (e.g. subcontracted) without disrupting the enterprise. Smart components may be defined and represent opportunities for development by the services providing company. A component map, when built, depicts the future enterprise and industry leading practices. The level of detail is appropriate for the required analysis (is retractable and expandable). Activities are performed only in one component.

Within each component, enterprise level key performance indicators are selected (FIG. 7, step 101) as described above.

Figure 10:
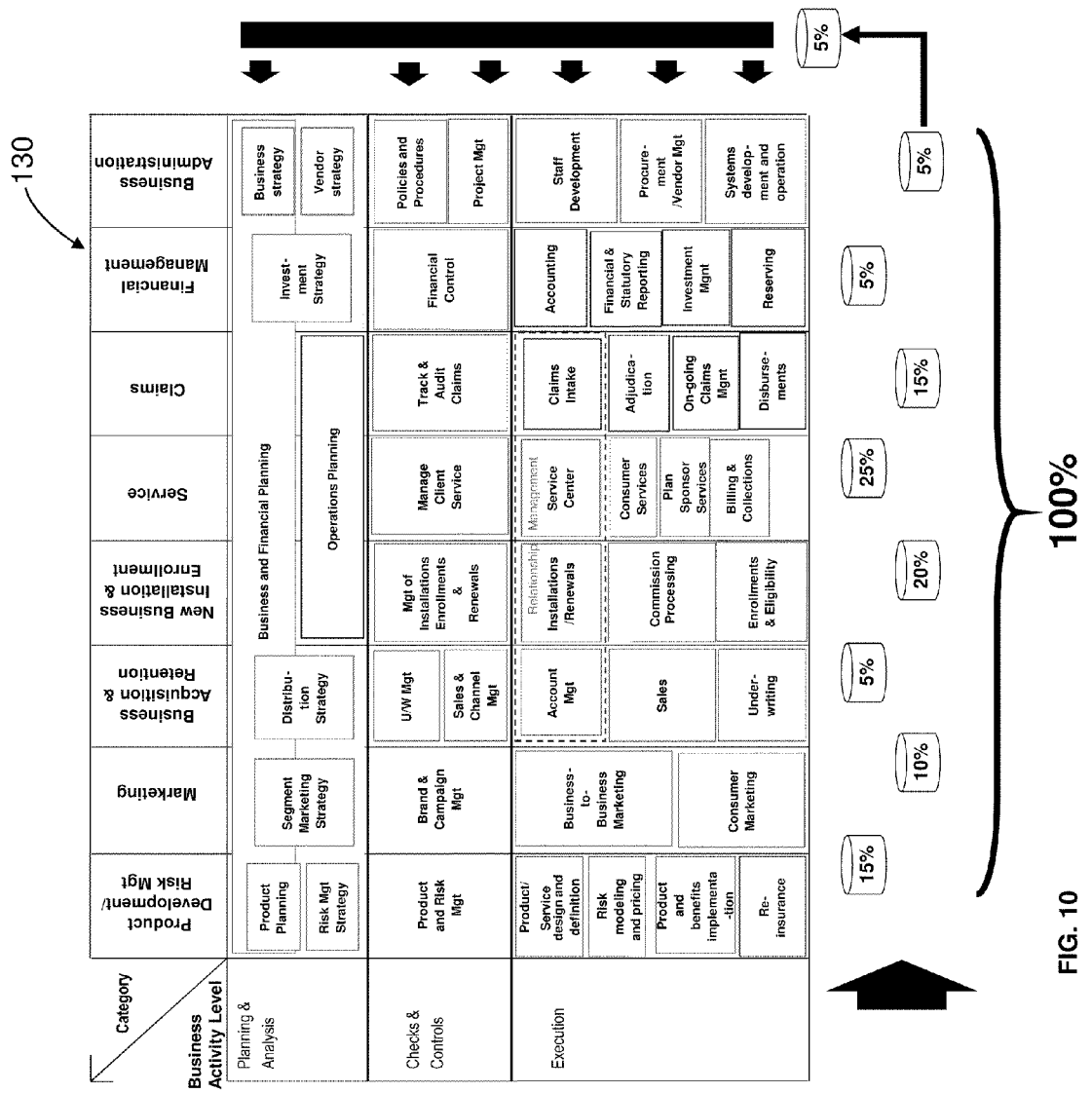
FIG. 10 is an example of a heat map.

In FIG. 10 there is shown an example of a heat map 130 in accordance with the present invention. The component map in FIG. 9 is filtered to form a heat map. For each activity category in component map 125, capabilities are defined that summarize how the enterprise seeks to perform in that aspect of its business. Target competitive levels are then determined for each capability. Competitive levels may then be used to filter component map 125.

Cost filtering may also be performed. For example, in FIG. 10, 15% of cost is allocated to the Product Development/Risk Management activity category. The allocation may be based on cost center data which may be collected in real-time by apparatus 140. Any other basis of allocating cost may be used such as by the number of full time equivalent (FTE) people required to perform the activities involved. For each column, the allocated cost is then distributed across components in that column on another basis, for example, headcount. In FIG. 10 the 5% allocated to Business Administration is distributed across the components in the last column by headcount.

Revenue filtering may be performed using similar allocation and distribution methods.

The results of filtering are summarized on the component map of FIG. 9 such as by indicating the competitive level, cost level, or revenue level for each component.

After applying the filtering just described, components are selected to form a heat map. Selected components should be components that drive the primary strategy of the company such as low cost provider, brand, servicing, and also have a large gap between the current and desired capabilities. Components that have a large potential to increase revenue or reduce cost may also be selected. Components that the client or interviewer have identified as problematic may be selected. Components required to perform key functions may also be selected.

A component map having only the selected components shall be designated herein to be a heat map.

Figure 11:
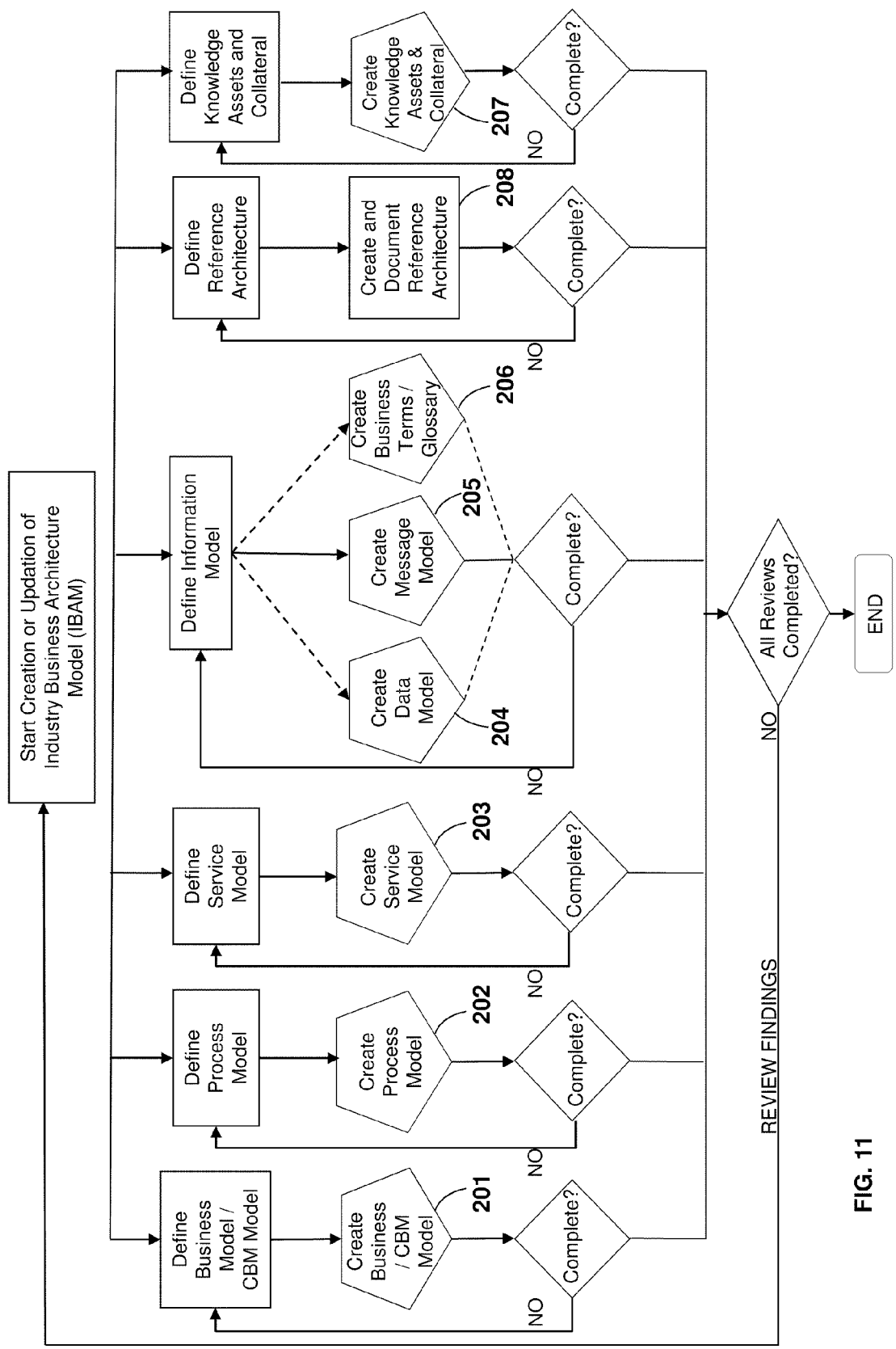
FIG. 11 is a flowchart for creating an IBAM.

In FIG. 11 there is shown a flowchart for creating or updating an IBAM. It is readily apparent that each path may be performed separately. For example, the Business/CBM model may be created or updated at any time, regardless of the status of other models. The process model in step 201 and service model are created in steps 202 and 203 respectively.

The information model has three parts, Data Model 204, Message Model 205, and Business Terms/Glossary 206, which may also be created or updated at any time. Reference architecture 208, and Knowledge Assets and Collateral 207 can also be created or updated at any time.

Note, however, that from FIG. 11, all 6 paths must be completed before the IBAM is completed.

Figure 12:
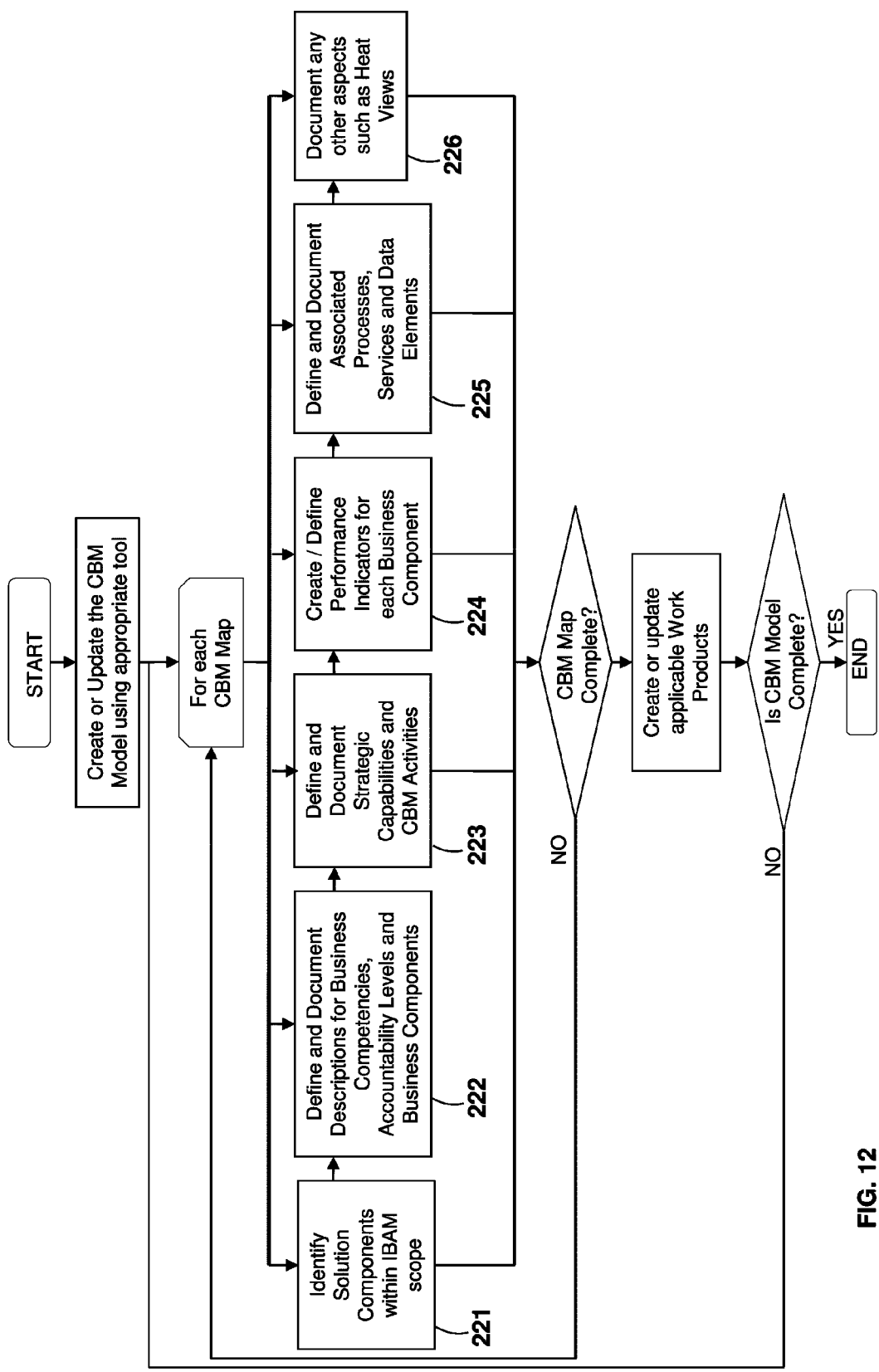
FIG. 12 is a flowchart for creating or updating a component business model.

In FIG. 12 there is shown a flowchart for creating or updating a CBM model. Solution components are identified in step 221. Business competencies, accountability levels, and business components are defined in step 222. In step 223, strategic capabilities and CBM activities are defined.

Performance indicators also referred to as key performance indicators (KPIs) for each component are defined in step 224. Associated processes, services, and data elements are defined in step 225. This may include defining linkages to other models in the IBAM such as linkages to elements or steps in the process model, service model, or information model.

In step 226, other aspects of the CBM model including a heat map, are defined.

Alternatively, the CBM model may be created using the steps described in Rackham U.S. 2005/0203784.

Figure 13:
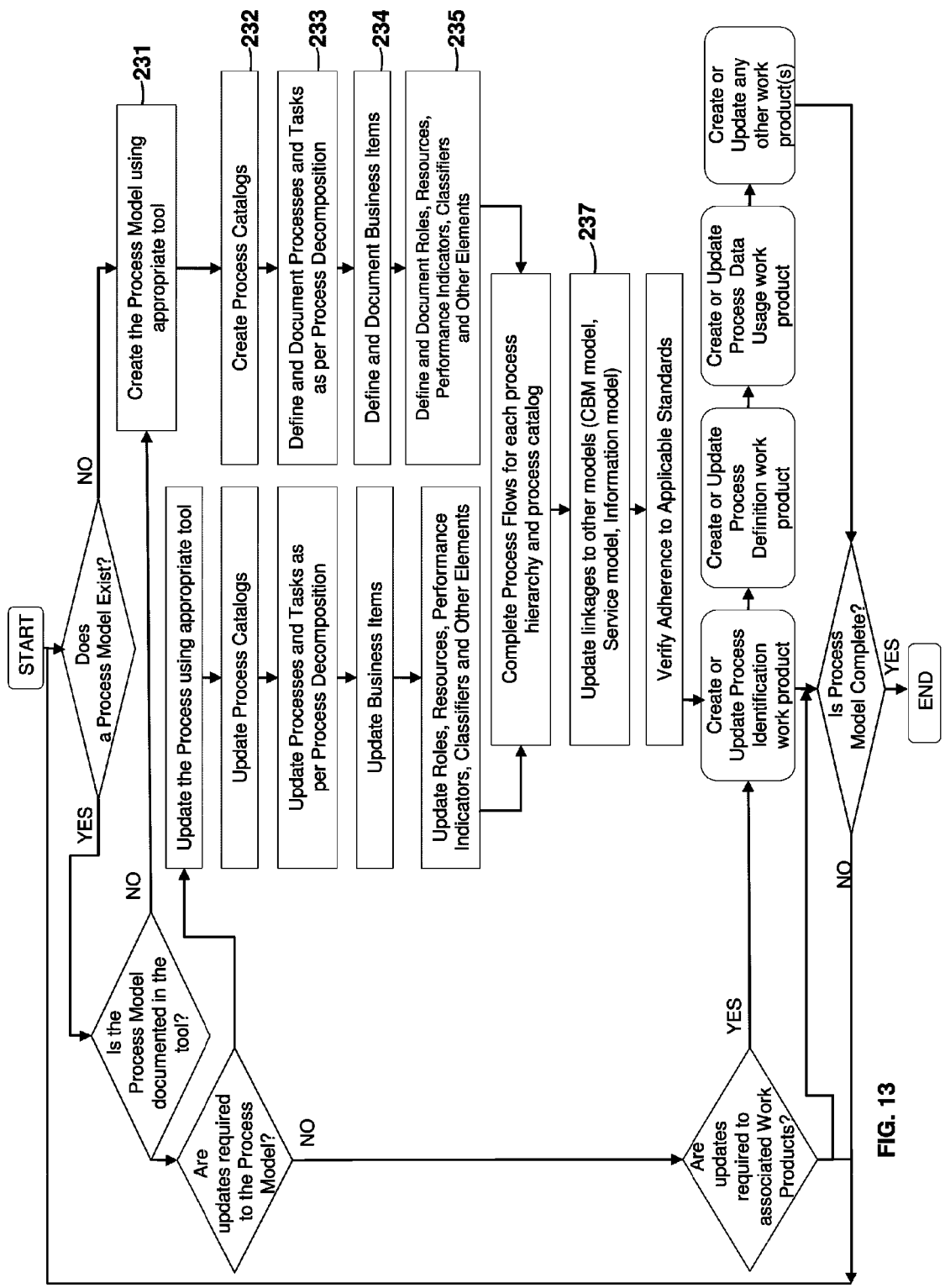
FIG. 13 is a flowchart for creating or updating a process model.

In FIG. 13 there is shown a flow diagram for creating or updating a process model. The most important steps in creating a process model 231-237 will be described. It will be obvious to one of ordinary skill how to update a process model, or any other model, therefore updating steps in the flowchart are not specifically described herein. In step 231 a process model is created using the tool of the present invention. In step 232 process catalogs are created. In step 233 processes and tasks resulting from process decomposition are defined. Business items are defined in step 234. Roles, resources, performance indicators, and classifiers are defined in step 235.

In step 237 linkages to other models including the CBM model, service model, and information model are defined or updated.

Figure 14:
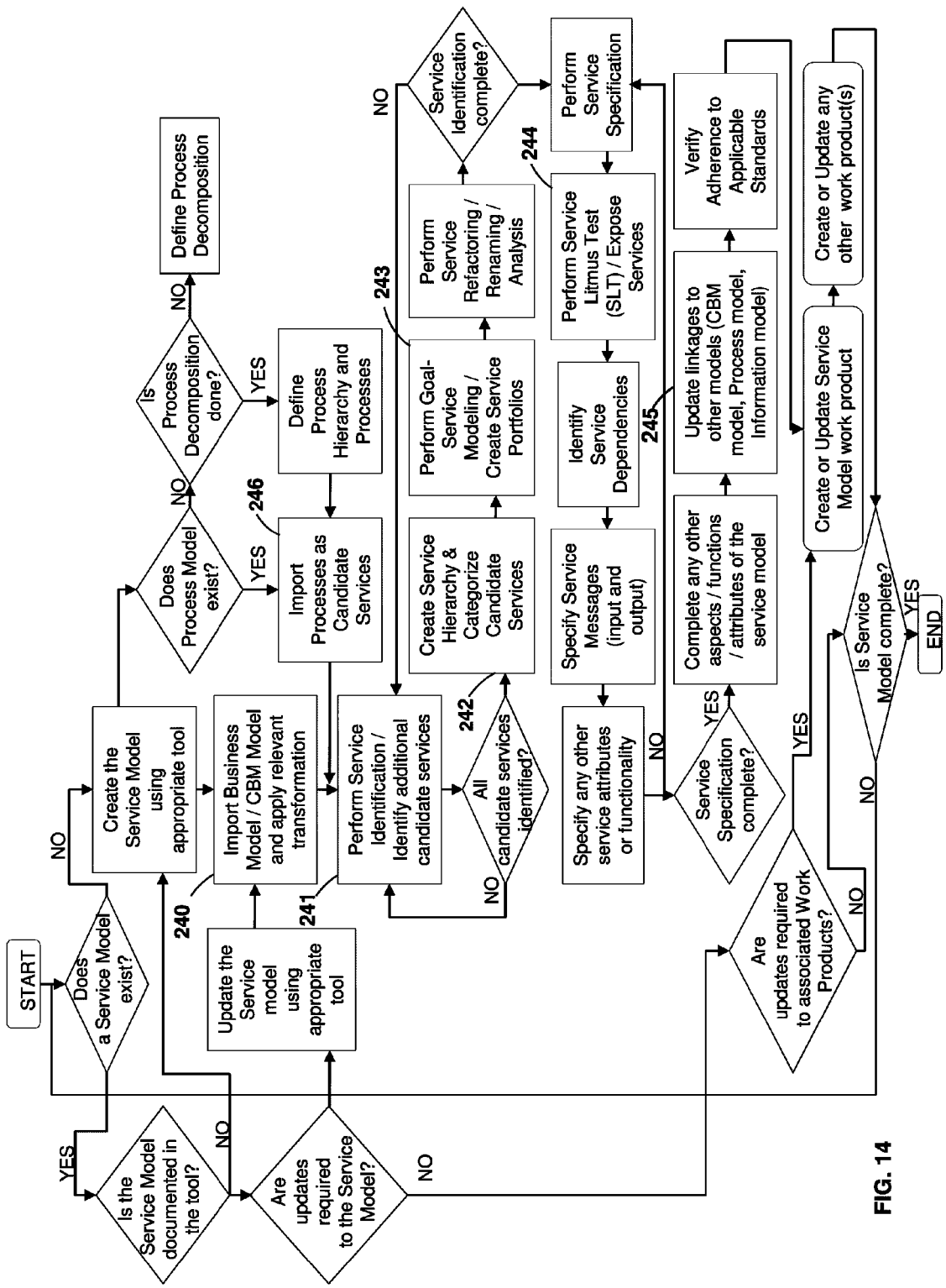
FIG. 14 is a flowchart for creating or updating a service model.

In FIG. 14 there is shown a flowchart for creating or updating a service model in accordance with the present invention. The CBM model is imported 240 and processes from the process model described above are imported 246.

Services are identified in step 241. A service hierarchy is created in step 242. In step 243, goal service modeling is performed to create service portfolios. Goal service modeling is described by Ang in U.S. patent application Ser. No. 11/496,917 filed Jul. 31, 2006 and published as U.S. 2008/0027784 on Jan. 31, 2008. In step 244 a service litmus test (SLT) is performed to expose services. Ang describes SLT in U.S. patent application Ser. No. 11/496,893 filed Jul. 31, 2006 and published as U.S. 2008/0126147 on May 29, 2008. Both applications by Ang shall be incorporated herein by reference in their entireties.

Figure 15:
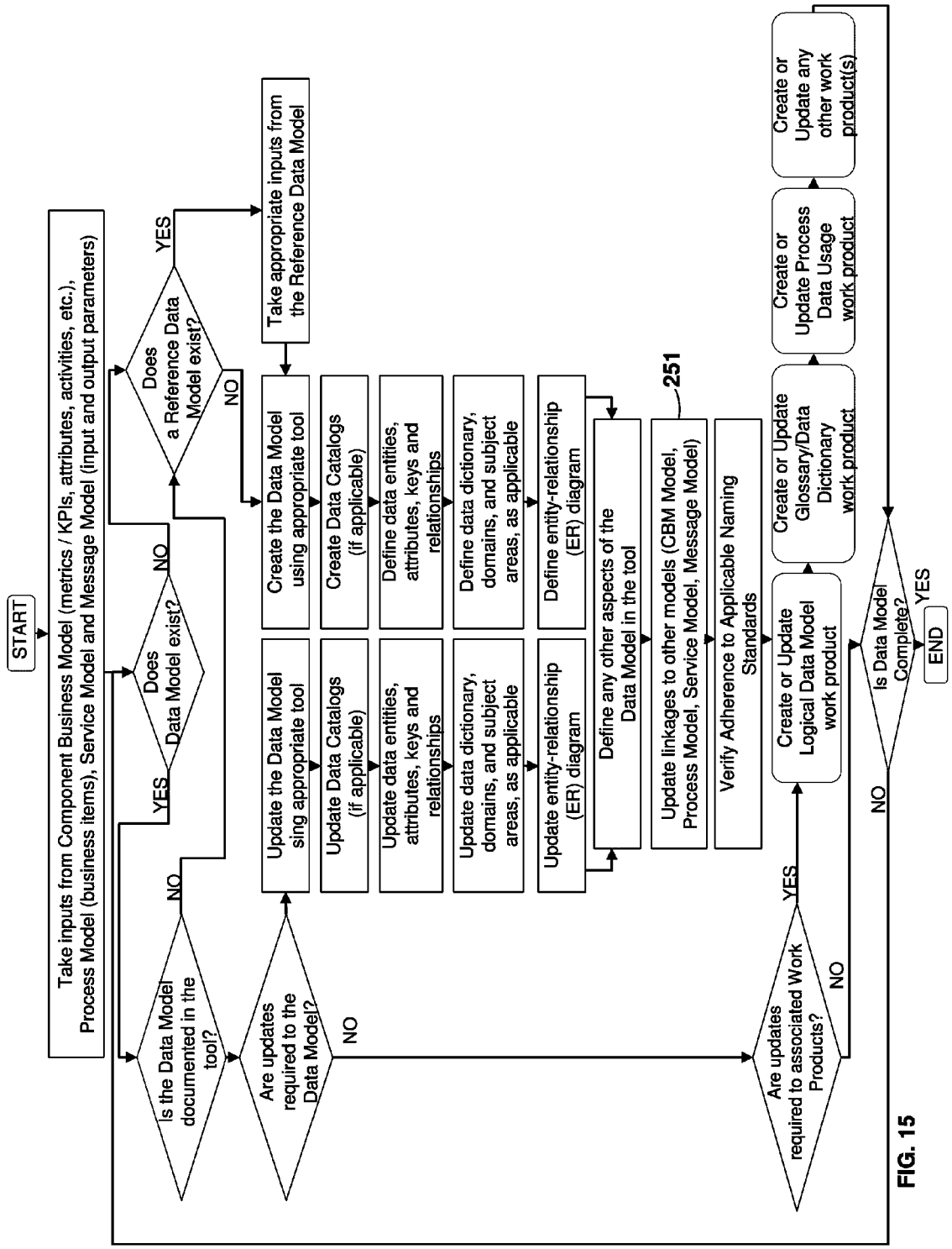
FIG. 15 is a flowchart for creating or updating the data model part of an information model.
Figure 16:
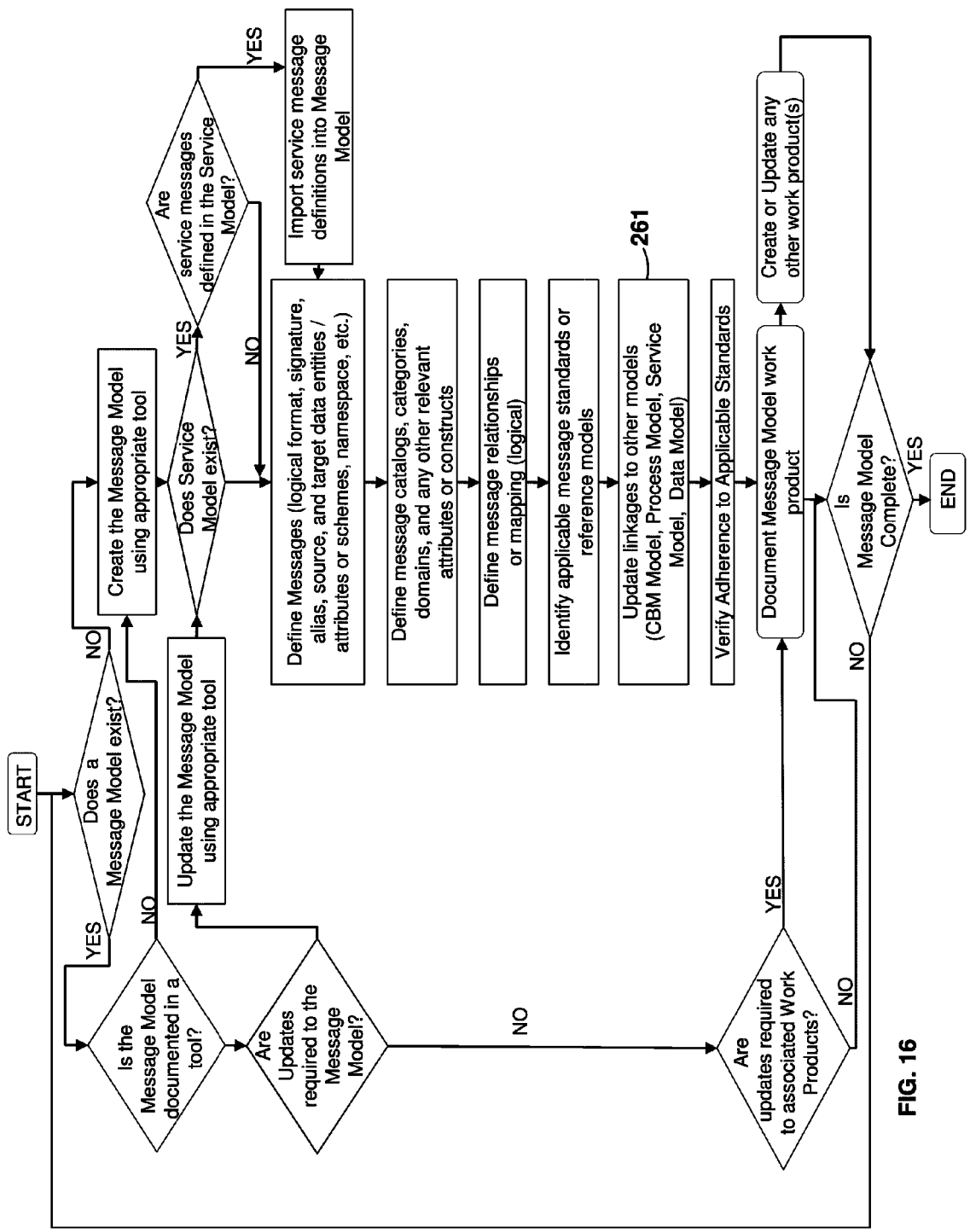
FIG. 16 is a flowchart for creating or updating the message model part of an information model.
Figure 17:
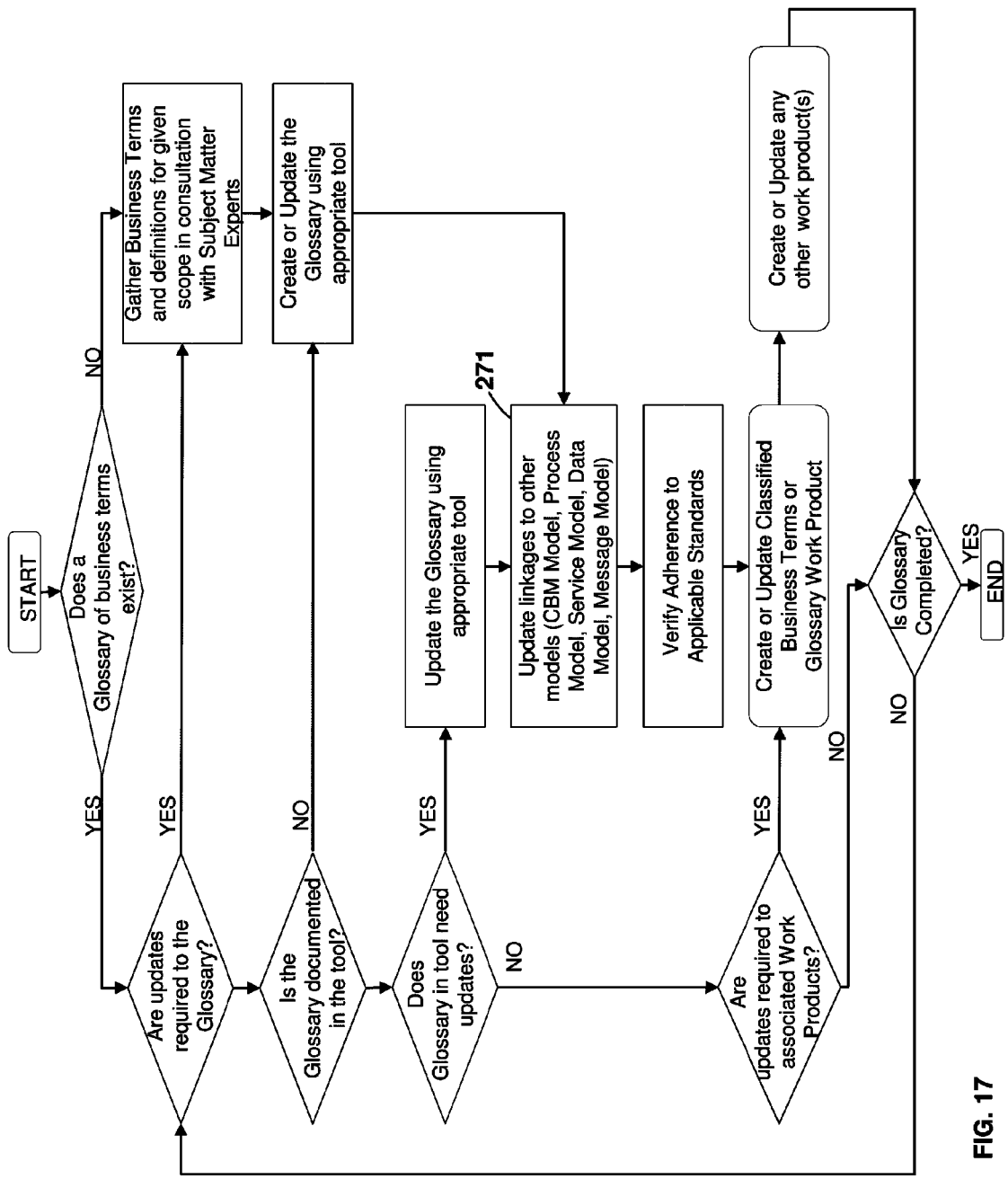
FIG. 17 is a flowchart for creating or updating the business terms/glossary part of an information model.

In FIGS. 15, 16, and 17 there are shown flowcharts for creating the data model, message model, and glossary of business terms, of an information model, respectively. It is important to note that each flowchart includes a step, 251, 261, and 271 respectively for creating linkages to other models in the IBAM, specifically CBM model, process model, and service model.

Although according to FIG. 11 the various IBAM models can be created or updated at any time, the various linkages tie each model to the others providing cohesion to the IBAM.

Figure 18:
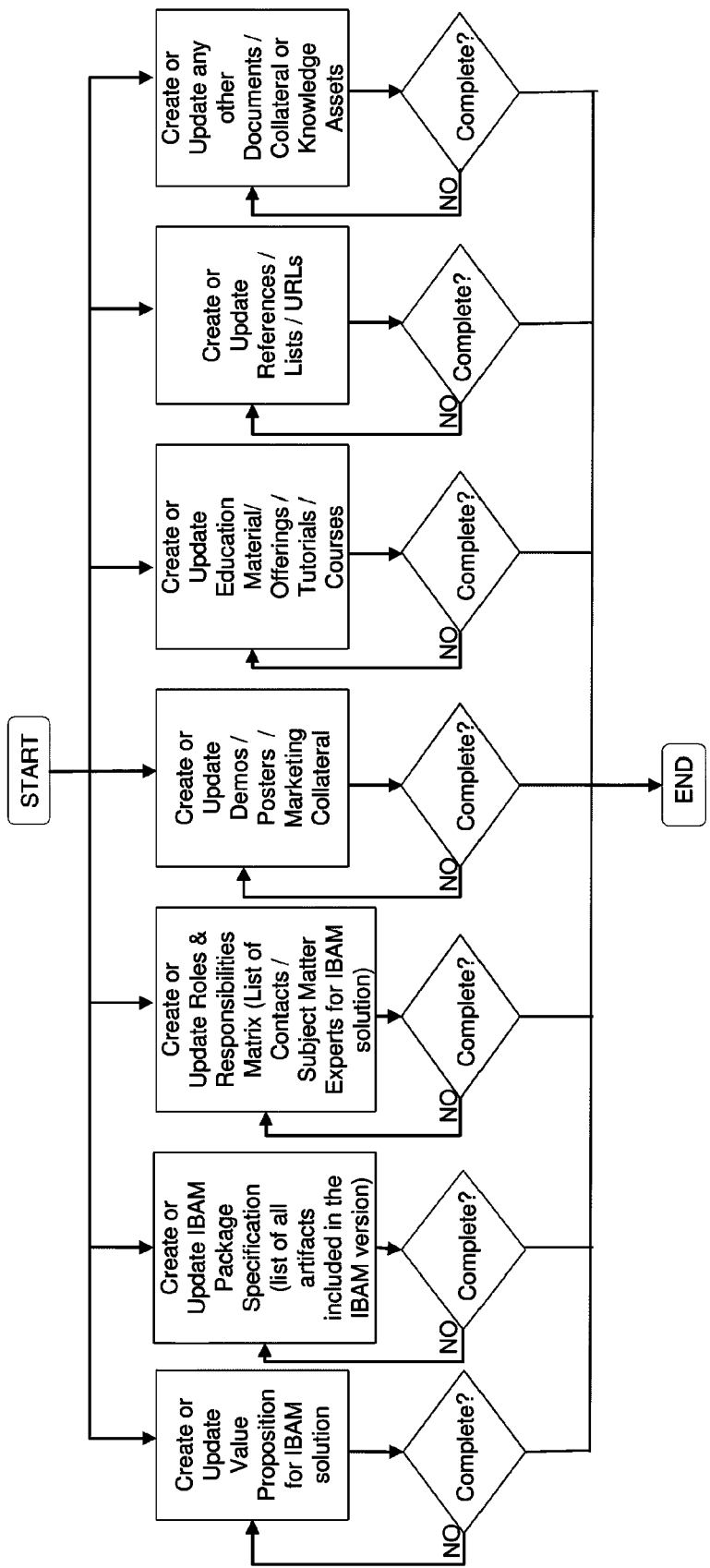
FIG. 18 is a flowchart for creating a listing of knowledge assets and collateral for use in an IBAM.

In FIG. 18 there is shown a flowchart for creating or updating additional parts of the IBAM. These include a value proposition, a package specification, roles and responsibilities matrix, demos, education material, references, and knowledge assets. Each of these can be created or updated at any time as shown in FIG. 18.

While there have been shown and described what are at present considered the preferred embodiments of the invention, it will be obvious to those skilled in the art that various changes and modification may be made therein without departing from the scope of the invention as defined by the appended claims.

What is claimed is:

1. A system for enhancing the business performance of an enterprise, comprising:
    one or more client systems;
    a server operably coupled to said one or more client systems over a network;
    a data storage device coupled to said server;
    a component business model map of components for said enterprise, said map having been developed using an industry business architecture model residing on said server, said model having business processes, enterprise key performance indicators, and attributes;
    operational key performance indicators in said model, based on said enterprise key performance indicators;
    an automatic data collection apparatus coupled to said server, for gathering cost center data from said enterprise, and therefrom calculating said enterprise and said operational key performance indicators, and gradients of said enterprise key performance indicators; and
    a real-time dashboard having a user interface comprising said component business model map, said key performance indicators, and said gradients for modifying said business processes and therefrom recalculating said key performance indicators using said cost center data and said gradients.

2. The system of claim 1, wherein said dashboard is adapted to show a heat map from said component business model map in response to selection of a corresponding enterprise key performance indicator.

3. The system of claim 1, wherein said dashboard displays a key performance indicator tree with one of said enterprise key performance indicators as the root and said operational key performance indicators as its children.

4. The system of claim 1, further comprising an enterprise architecture assessment model performing:
    generating a maturity model map including a component business model, a process model, a service model, and an information model, each said model having content elements;
    defining specific levels of maturity for said maturity model map;
    determining associations, relationships, and linkages between said content elements; and
    therefrom determining one of said specific levels of aggregate maturity for said business model according to an algorithm.

5. The system of claim 1 wherein said industry business architecture model comprises a component business model, a process model, a services model, and an information model.

6. The system of claim 5 wherein said information model comprises a data model, a message model, and a glossary of business terms.

* * * * *